United States Patent [19]

Oyoshi et al.

[11] Patent Number: 5,258,797
[45] Date of Patent: Nov. 2, 1993

[54] CAMERA SHUTTER DEVICE INCORPORATED WITH LENS SHIFTING MECHANISM

[75] Inventors: Masato Oyoshi; Nobuyoshi Inoue, both of Itabashi, Japan

[73] Assignee: Copal Company Limited, Tokyo, Japan

[21] Appl. No.: 908,836

[22] Filed: Jul. 2, 1992

Related U.S. Application Data

[63] Continuation-in-part of Ser. No. 550,518, Jul. 10, 1990, abandoned.

[30] Foreign Application Priority Data

Jul. 12, 1989 [JP] Japan ................. 1-82066[U]
Mar. 27, 1990 [JP] Japan ................. 2-77285

[51] Int. Cl.$^5$ ................. G03B 9/14; G03B 13/36
[52] U.S. Cl. ................. 354/400; 354/435; 354/258.1; 354/234.1
[58] Field of Search ................. 354/400, 195.1, 195.12, 354/402, 403, 404–409, 412, 435, 439, 226, 247, 246, 245, 250, 266, 234.1, 436, 437, 258.1

[56] References Cited

U.S. PATENT DOCUMENTS

4,870,439 9/1989 Tsuboi et al. ................. 354/195.12
4,985,724 1/1991 Akimoto et al. ................. 354/400

*Primary Examiner*—W. B. Perkey
*Attorney, Agent, or Firm*—Graham & James

[57] ABSTRACT

The camera shutter device incorporated with lens shifting mechanism comprises a driving motor which is so controlled as to be rotated in the normal direction in the focusing process, and in the reverse and normal directions in the exposure process, a cam ring allowing a lens barrel to be shifted from a standard position to at least one forward-shifted position by the rotation of the driving motor in the normal direction in the focusing process, and a shutter blades opening and closing lever allowing the shutter blades to be opened and closed by the rotations of the driving motor in the reverse and normal directions in the exposure process. The camera shutter device permits simplifying the overall structure thereof and the operating sequence from the focusing operation to the exposure operation, and reducing the force and turning stroke required for shutter setting.

4 Claims, 6 Drawing Sheets

CAMERA SHUTTER DEVICE INCORPORATED WITH LENS SHIFTING MECHANISM

This is a continuation-in-part of copending application Ser. No. 07/550,518 filed on Jul. 10, 1990, now abandoned.

BACKGROUND OF THE INVENTION a) Field of the invention

The present invention relates to a camera shutter device incorporated with lens shifting mechanism using a motor as driving power source.

b) Description of the prior art

In some of the so-called autofocus type compact cameras, the shutter devices are incorporated with lens shifting mechanisms for autofocus by integrating the shutter blocks with the lens barrels for compact designs of the cameras, etc. These cameras use stepping motors or electromagnetic actuators as the driving power sources for lens shifting as well as the shutter opening and closing operation. The shutter devices incorporated with lens shifting mechanisms are classified into the set type and the setless type, both of which perform two kinds of operations, i.e., the lens shifting operation and the shutter opening and closing operation with a single driving power source, thereby posing the problems described below.

The set type shutter device requires a complicated mechanism, a large setting force and a long setting stroke. On the other hand, the setless type shutter device, for which a simple mechanism is sufficient, requires a magnet device in addition to an actuator adopted as the driving source, thereby complicating operating sequence thereof.

SUMMARY OF THE INVENTION

A primary object of the present invention is to provide a camera shutter device incorporated with lens shifting mechanism which has a simple structure and is capable of simplifying operating sequence.

Another object of the present invention is to provide a camera shutter device incorporated with lens shifting mechanism which permits reducing the setting force and shortening the setting stroke.

The camera shutter device incorporated with lens shifting mechanism according to the present invention comprises a driving motor, a rotating arm which is fixed to the output shaft of the driving motor and elastically held so as to be settable at a predetermined neutral position, a lever within is engageable with the rotating arm and capable of opening and closing the shutter blades, a first lock lever which is engageable with the rotating arm and the shutter blades opening and closing lever, and capable of holding the shutter blades opening and closing lever at a blades closing position, a second lock lever engageable with the rotating arm, a lens shifting member which is engageable with the second lock lever, and capable of setting a movable lens at a standard position and at least one forward shifted position, a drive control circuit which is connected to the driving motor and capable of controlling rotation of the driving motor, a photographing distance measuring means connected to the drive control circuit, and an exposure time control means connected to the drive control circuit; and is adapted in such a manner that, upon transmission of an output signal from the photographing distance measuring means to the drive control circuit, the driving motor rotates in the normal direction to turn the lens shifting member for moving the movable lens from the standard position to the forward-shifted position and then open the shutter blades, and the driving motor rotates in the reverse direction to close the shutter blades when an output signal is transmitted to the drive control circuit from the exposure time control means which is operated upon the opening of the shutter blades.

In the camera shutter device according to the present invention, the lens shifting member is adapted to be capable of setting the movable lens at a plurality of forward-shifted positions and bringing back to the standard position upon performing the setting operation. Since the camera shutter device according to the present invention uses a single driving motor as the driving power source it is possible to simplify the mechanism and operating sequence of the camera shutter device.

These and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Now, the present invention will be described detailedly below with reference to the preferred embodiments illustrated in the accompanying drawings.

Figure 2:
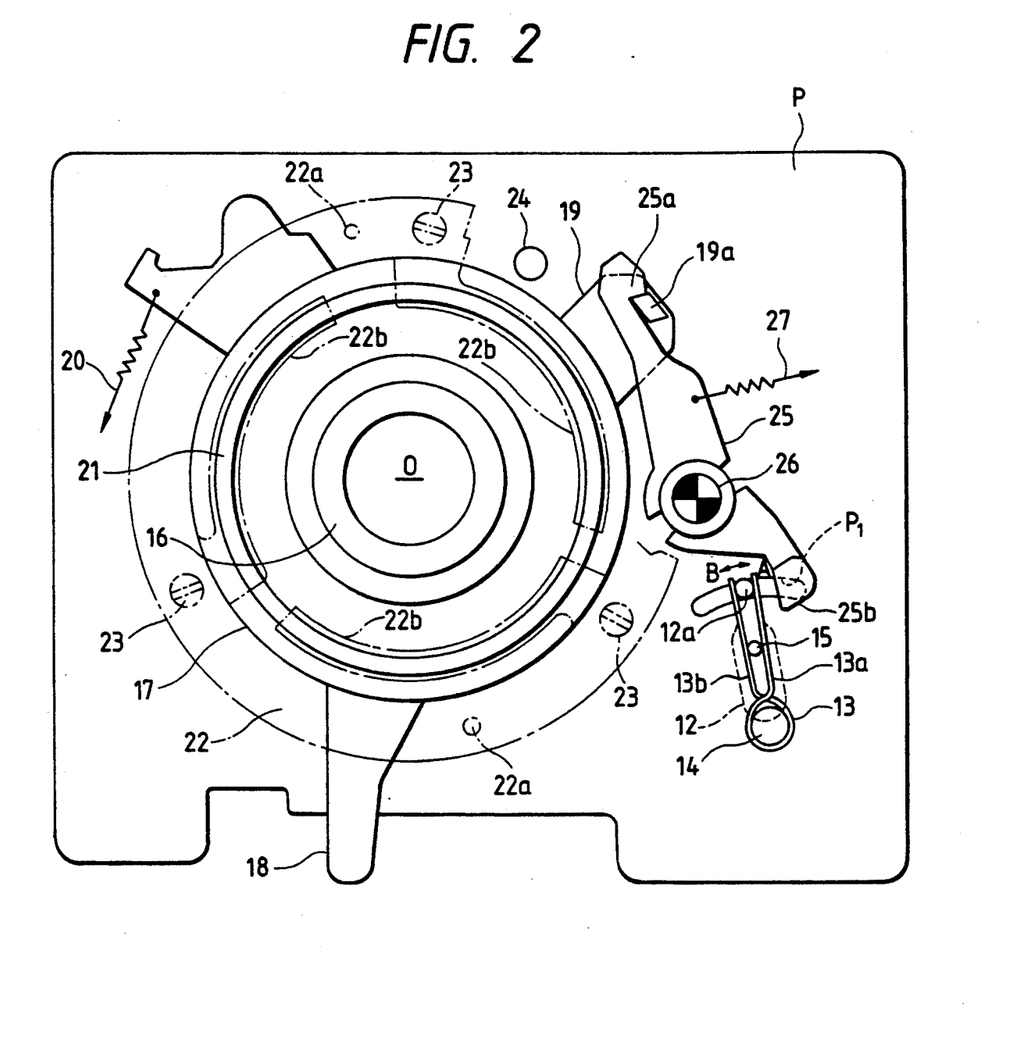
FIG. 2 is a front view illustrating the main part shown in FIG. 1.
Figure 3:
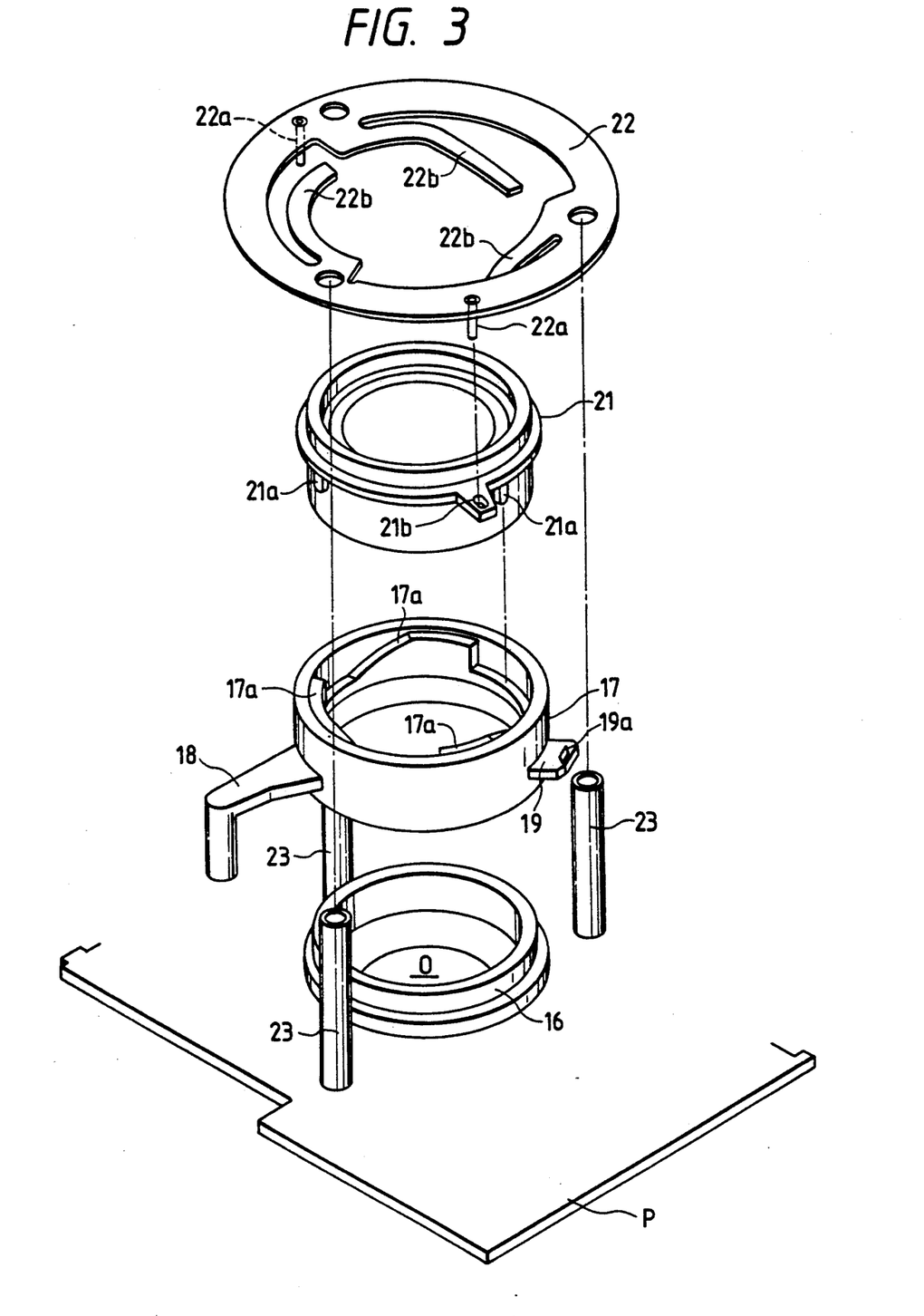
FIG. 3 is a perspective view illustrating the detailed structure of the lens shifting mechanism.

First, the Embodiment 1 of the present invention will be described with reference to FIG. 1 through FIG. 4, wherein the reference symbol p represents a base plate which has an exposure aperture 0 and is to be fixed to a camera body (not shown), the reference numerals 1 and 2 designate shutter blades which are pivoted respectively to shafts 3 and 4 planted on the base plate p for opening and closing the exposure aperture 0, and have slots 1a and 2a respectively, the reference numeral 5 denotes a shutter blades opening and closing lever which is pivoted to a shaft 6 planted on the base plate p, and has a pin 5a inserted commonly into the slots 1a and 2a formed respectively in the shutter blades 1 and 2, the reference numeral 7 represents a spring for biasing the shutter blade opening and closing lever 5 clockwise, i.e., in the opening direction, the reference numeral 8 designates a lock lever which is pivoted to a shaft planted on the base plate p and has a hook portion 8a engageable with a protrusion 5a formed on the shutter blades opening and closing lever 5, the reference numeral 10 denotes a spring for biasing the lock lever 8 clockwise, the reference numeral 11 represents a driving motor which is fixed to the base plate P, and has a rotor adapted to rotate in both the normal and reverse directions, within a predetermined angular range smaller than 90° by supplying single pulse currents different from each other in polarity the reference numeral 12 designates a rotating arm which is fixed to the rotor of the driving motor 11, and has a pin 12a engageable with an end 5c of the shutter blades opening and closing lever 5 and an arm end 8a of the lock lever 8, the reference numeral 13 (FIG. 2) denotes a spring which is connected between pins 14 and 15 fixed on the base plate P and sandwiches the pin 12a of the rotating arm 12 by means of its arms 13a, 13b said pin can be held at the neutral position within a moving range thereof, the reference numeral 16 represents a ring which is fixed to the base plate P as illustrated in FIG. 3 and delimits the exposure aperture O, the reference numeral 17 designates a cam ring which is rotatably fitted over the ring 16, and has a setting lever 18 and an arm 19 on the outer circumferential surface thereof as well as three lens shifting cams 17a of the same shape on the inner circumferential surface thereof, the reference numeral 20 (FIG. 2) denotes a spring for biasing the cam ring 17 counterclockwise, the reference numeral 21 represents a lens barrel which is rotatably fitted in the cam ring 17 and has three cam followers 21a (only two cam followers are shown) engaged with the lens shifting cams 17a, the reference numeral 22 designates a leaf spring which is attached to three supports 23 studded on the base plate P, and has pins 22a to be inserted into slots 21b formed in the lens shifting ring 21 as well as elastically pressing portions 22b engaged with the top surface of the lens shifting ring 21, the reference numeral 24 (FIG. 2) denotes a stopper which is studded on the base plate p and engaged with the arm 19 for holding the cam ring 17 at the position for setting the movable lens at the forward-shifted position, the reference numeral 25 represents a lock lever which is pivoted to a shaft 26 planted on the base plate P, and has a hook portion 25a engageable with a protrusion 19a formed on the arm 19 and an end portion 25b located within the path of the pin 12a of the rotating arm 12, the reference numeral 27 designates a spring for biasing the lock lever 25 clockwise, the reference numeral 28 (FIG. 1) denotes a movable contact which is attached to a pin 29 planted on the base plate P and engaged at the end thereof with the pin 5a of the shutter blade opening and closing lever 5, the reference numeral 30 represents a stationary contact attached to the base plate p in an electrically insulated condition, the reference numeral 31 (FIG. 4) designates a photographing distance measuring means which is built in the camera body, starts operating, upon depression of a distance measuring button 32, to measure a distance to an object to be photographed and is capable of outputting a distance signals for short distance photography, medium distance photography and long distance photography, the reference numeral 33 denotes an exposure time control means which is built in the camera body and commences its action when the movable contact 28 is contacted with the stationary contact 30, and issues an exposure end signal therefrom when a proper exposure time has passed; and the reference numeral 34 represents a drive control circuit which supplies a single pulse current to the driving motor 11, to rotate the rotating arm 12 for example, in the normal direction when a distance signal is inputted into the drive control circuit from the photographing distance measuring means 31, for example, in the reverse direction when the shutter release button 35 is depressed and, for example, in the normal direction when an exposure end signal is inputted into the drive control circuit from the exposure time control means 33.

The cam ring 17 is moved, by way of the setting lever 18, to the position shown in FIG. 2 in conjunction, for example, with the film winding operation. Further, the shifting cam 17a is formed in such a manner that is capable of holding the lens barrel 21 at the position for short distance photography when the cam ring 17 is set in the position shown in FIG. 2, and moving the lens barrel 21 to the position for long distance photography when the cam ring 17 is rotated counterclockwise until the arm 19 is engaged with the stopper 24. In this case, the lens barrel 21 is always biased downward in FIG. 3, i.e., toward the position for short distance photography by the elastically pressing portion 22b of the leaf spring 22. The pin 12a of the rotating arm 12 extends through the slot $P_1$ formed in the base plate P.

Figure 1:
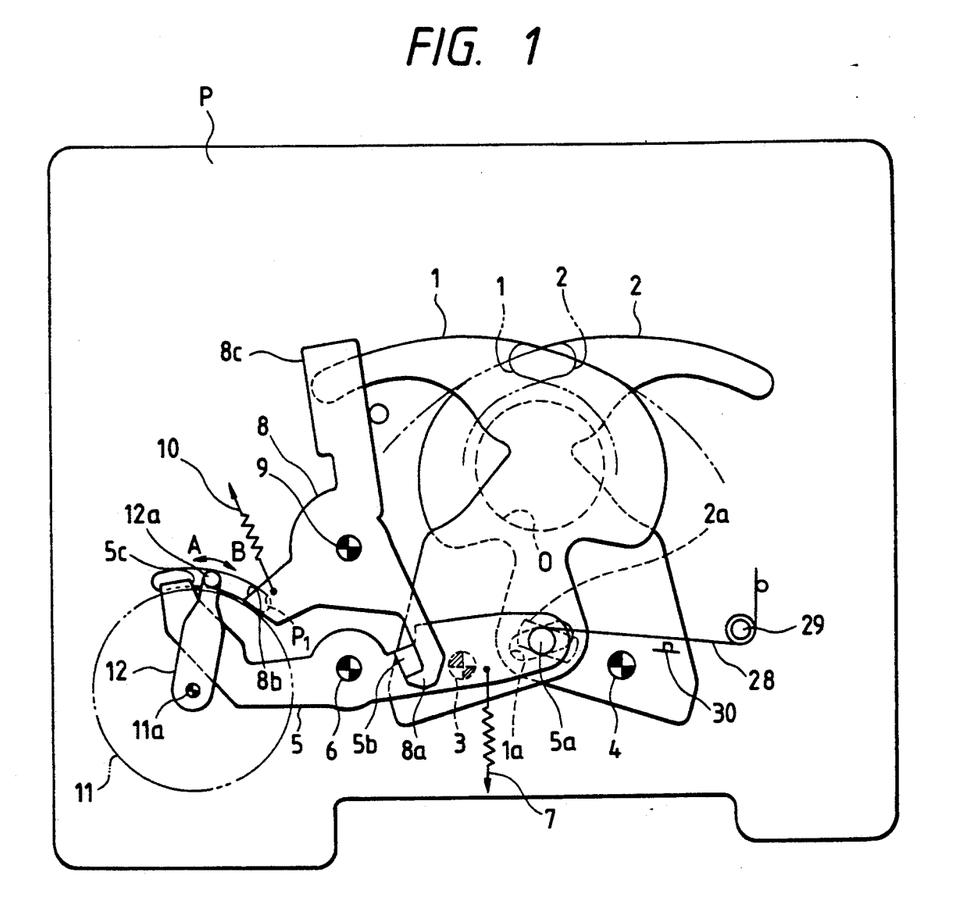
FIG. 1 is a rear view illustrating the main part of an Embodiments 1 of the camera shutter device incorporated with lens shifting mechanism according to the present invention.
Figure 4:
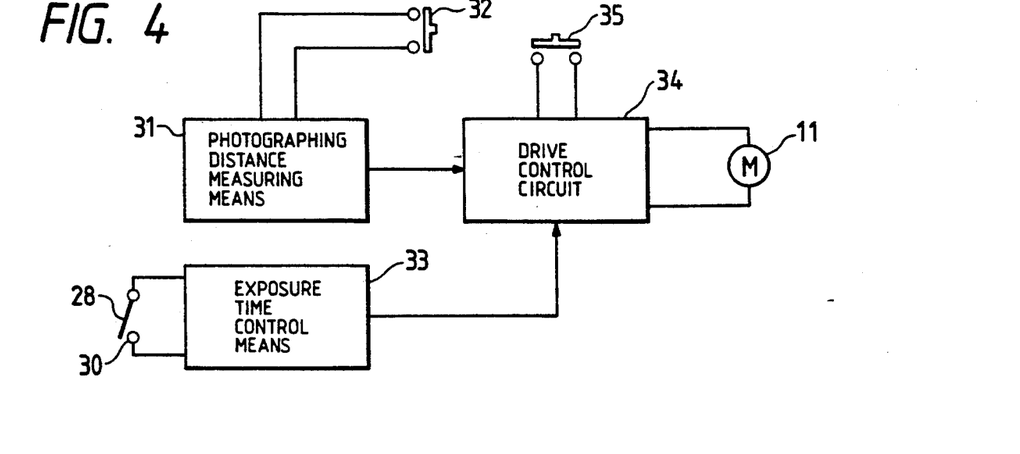
FIG. 4 is a block diagram of an electric circuit.

Now, operations of the Embodiment 1 will be described below:

FIG. 1 and FIG. 2 show a condition of the shutter device corresponding to the film wound-up position. When the camera is set so as to face an object to be photographed and the button 32 (FIG. 4) is depressed, the photographing distance measuring means 31 is placed in operating condition, and outputs no signal when the object is located within the short distance photography range or issues a signal when the object is located within the long distance photography range. In the former case, the driving motor 11 is not energized and the rotating arm 12 is kept at the neutral position shown in the drawings by the spring 13 to keep the cam ring 17 stationary. In the latter case, the drive control circuit 34 supplies a single pulse current to the driving motor 11 to rotate the rotating arm 12 in the normal direction, whereby the rotating arm 12 turns in the direction indicated by the arrow A in FIG. 2 against the spring arm 13a, and returns to the neutral position accordingly, the pin 12a becomes engaged with the arm end portion 25b of the lock lever 25 and rotates it counterclockwise against the spring 27. Since the hook 25a is disengaged from the protrusion 19a by the counterclockwise rotation of the lock lever 25, the cam ring 17 is rotated counterclockwise by the spring 20 from the position shown in FIG. 2 until the arm 19 becomes engaged with the pin 24. The shifting cams 17a are rotated counterclockwise along with the counterclockwise rotation of the cam ring 17 to move the lens barrel 21 forward (upward in FIG. 3) against the spring 22, thereby setting the photographing lens at the position for long distance photography. When the shutter release button 35 (FIG. 4) is depressed subsequently, the drive control circuit outputs a signal pulse current to the driving motor 11 to turn the rotating arm 12 in the reverse direction and to allow the same to return to the neutral position. Accordingly, the rotating arm 12 is turned at a high speed in the direction indicated by the arrow B in FIG. 1 and the pin 12a becomes engaged with the arm end portion 8b of the lock lever 8, thereby rotating the lock lever 8 counterclockwise in FIG. 1 against the spring 10. Since the hook 8a is disengaged from the protrusion 5b by the counterclockwise rotation of the lock lever 8, the lever 5 is rotated clockwise in FIG. 1 at a high speed by the spring 7. As a result, the shutter blades 1 and 2 are rotated around the shafts 3 and 4 respectably and open the exposure aperture O to start exposure of the film. Since the movable contact 28 follows the pin 5a and turns around the support 29, the movable contact 28 becomes contact with the stationary contact 30 upon the start of exposure to start operating the exposure time control means 33 (FIG. 4). The exposure time control means 33 calculates a proper exposure time on the basis of the brightness of the object to be photographed, diaphragm value sensitivity of the film used, etc., and outputs an exposure end signal to the drive control circuit 34 upon lapse of the exposure time, thereby allowing the circuit 34 to output a single pulse current to the driving motor 11 to turn the rotating arm 12 in the normal direction and to allow the same to return to the neutral position. Accordingly, the rotating arm 12 is turned at a high speed in the direction indicated by the arrow A in FIG. 1, and in this while, the pin 12a becomes engaged with the arm end portion 5c of the lever 5 and turns it counterclockwise against the spring 7, thereby bringing the shutter blades 1 and 2 to the closed positions thereof to terminate the exposure operation. At the final stage of the counterclockwise rotation of the lever 5, the protrusion 5b becomes engaged with the hook 8a of the lock lever 8 to hold the lever 5 at the position shown in FIG. 1. In addition, the movable contact 28 becomes apart from the stationary contact 30. Since the lock lever 25 is rotated counterclockwise in FIG. 2 by the rotation of the rotating arm 12 in the direction indicated by the arrow A, the cam ring 17 is turned counterclockwise and the lens barrel 21 is moved to the position for long distance photography even in a case where an object located at a short distance is to be photographed. The shutter device thus completes the operations for exposing a single film frame. When the photographer winds up the film for preparation for the next exposure, the cam ring 17 is brought back again to the position shown in the drawings and the lens barrel is simultaneously returned to the position for short distance photography by the leaf spring 22, whereby the protrusion 19a becomes engaged with the hook 25a of the lock lever 25 to hold the cam ring 17 at the position shown in the drawings.

In the Embodiment 1 described above, the buttons 32 and 35 are designed as separate parts to be operated separately. However, these parts may be operated sequentially by depressing a single button mounted on the camera body. In such a case, it is needless to say that the shutter device is equipped, for preventing malfunction, with a means which allows effective shutter release operation only after the forward shift of the lens is completed. Further, the single pulse currents outputted at the plural steps from the drive control circuit 34 are so designed as to have adequate duration times taking assembling variations and operating delay in the mechanism into consideration. Furthermore, though the Embodiment 1 is adapted to permit setting the movable lens at the positions only for short distance photography and long distance photography, it is possible to design the shutter device so as to permit setting the movable lens at more positions for photography.

Figure 5:
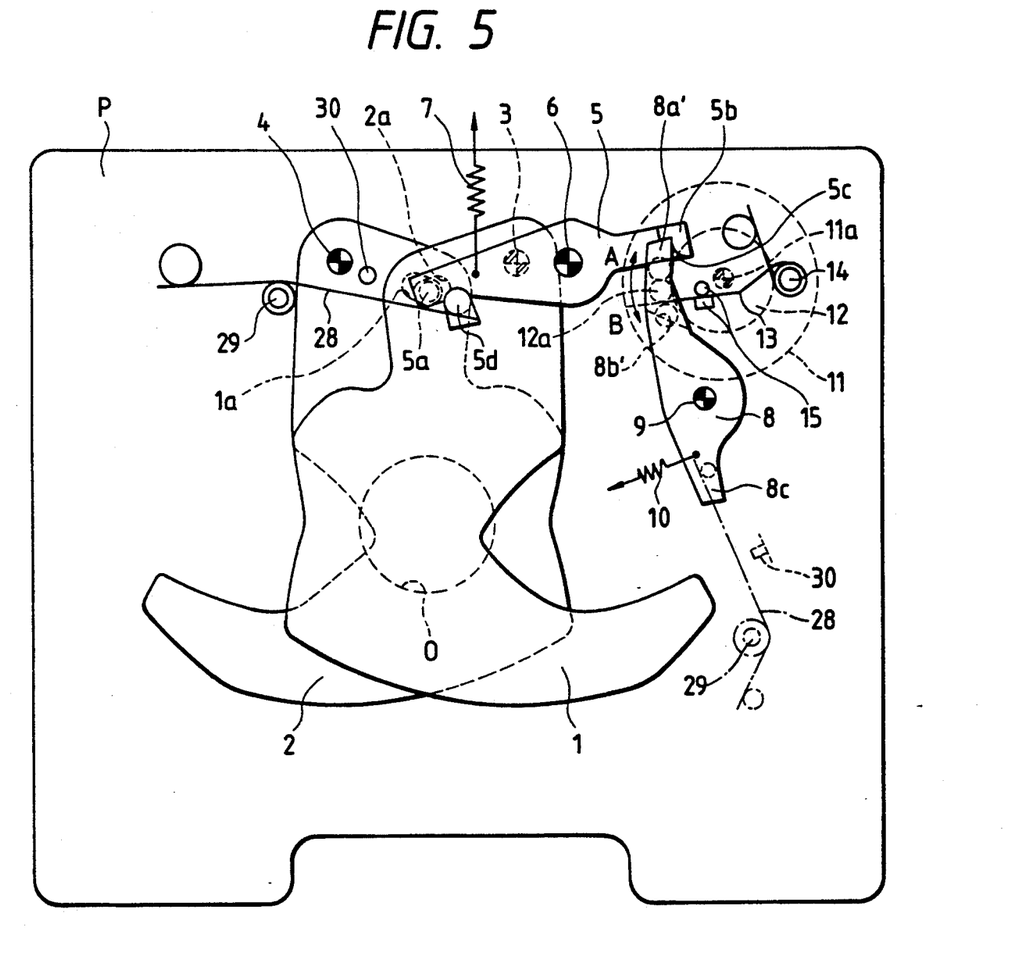
FIG. 5 is a rear view illustrating the main part of an Embodiment 2 of the camera shutter device incorporated with lens shifting mechanism according to the present invention.
Figure 6:
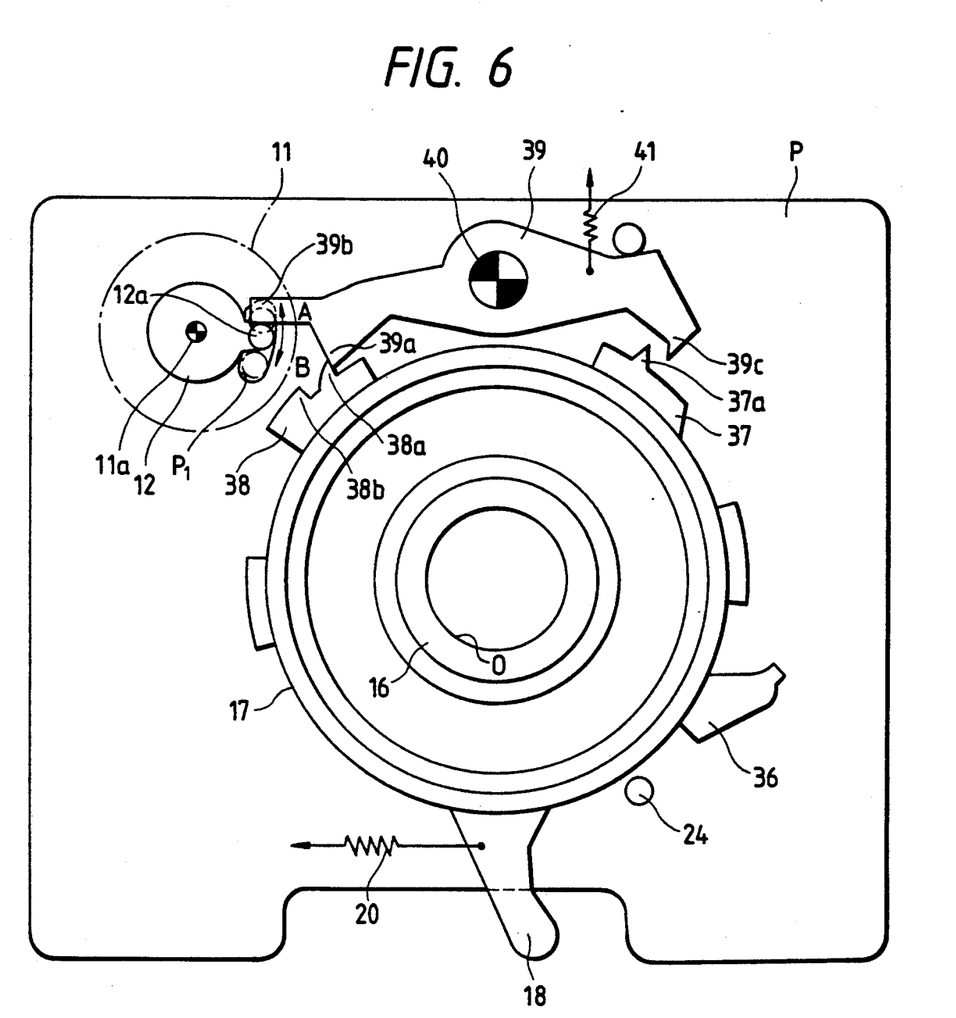
FIG. 6 is a front view illustrating the main part shown in FIG. 5.

FIG. 5 and FIG. 6 illustrate the Embodiment 2 of the present invention. Unlike the Embodiment 1, the Embodiment 2 is adapted to permit setting the movable lens at a position for medium distance photography in addition to those for short distance photography and long distance photography. However, the Embodiment 2 has a fundamental composition which is substantially the same as that of the Embodiment 1 and will be described briefly, while omitting detailed description on the composition and operations thereof, by using the same reference numerals for the parts which are substantially the same as those of the Embodiment 1. In the Embodiment 2, formed on the cam ring 17 are an arm 36a which is to be engaged with the pin 24 at the position for long distance photography, an engaging portion 37 having a claw 37a, and another engaging portion 38 having two claws 38a and 38b. The reference numeral 39 represents a lock lever which is pivoted to a shaft 40 planted on the base plate P, and has a protrusion 39a engageable with the claws 38a and 38b of the engaging portion 38, an arm end portion 39b engageable with the pin 12a of the rotating arm 12, and a claw 39c engageable with the claw 37a of the engaging portion 37, and the reference numeral 41 designates a spring for biasing the lock lever 39 counterclockwise. The protrusion 39a of the lock lever 39 is engaged with the claw 38a as illustrated in the drawings at the set position of the cam ring 17, i.e., the position for short distance photography, or with the claw 38b at the position for medium distance photography. Since the Embodiment 2 is adapted to set the movable lens at the positions for medium distance photography and long distance photography in the course of the clockwise stroke of the cam ring 17 as seen from the drawings, the shifting cams are sloped reversely as compared with the shifting cams in the Embodiment 1. Further, in the Embodiment 2, the protrusion 5b is formed at the end of the shutter blade opening and closing lever 5, and formed on the bottom surface of the lock lever 8 is an inclined step 8b' which is to be engaged with the pin 12a of the rotating arm 12 for rotating the lock lever 8 counterclockwise when the driving motor 11 rotates in the reverse direction, i.e., the direction indicated by the arrow B. Furthermore, the drive control circuit 34 is adapted to issue, on the basis of the output from the photographing distance measuring means 31, a single pulse-like driving current at the position for medium distance photography and two pulse-like driving currents at the position for long distance photography.

Now, description will be made on the operation to set the photographing lens at the position for medium distance photography or long distance photography. When the drive control circuit 34 issues a current pulse-like driving signal upon operation of the distance measuring button 32, the driving motor 11 rotates in the normal direction and the rotating arm rotates for a predetermined angle in the direction indicated by the arrow A and then returns to the neutral position. Accordingly, the pin 12a of the rotating arm 12 pushes the arm end portion 39b of the lock lever 39 to turn the lever 39 clockwise against the spring 41, whereby the protrusion 39a of the lock lever 39 is disengaged from the claw 38a of the engaging portion 38 and the claw 39c immediately becomes engaged with the claw 37a of the engaging portion 37. Since the driving motor is deenergized at this time, the lock lever 39 is rotated counterclockwise by the spring 41 and the protrusion 39a of the lock lever 39 becomes engaged with the claw 38b of the engaging portion 38. At this time, the rotating arm 12 is also returned to the neutral position thereof. The cam ring 17 is thus turned clockwise for a predetermined angle by the spring 20 and stopped at the position to set the movable lens at the first forward-shifted position, whereby the lens barrel 21 is brought to the position for the medium distance photography. When the drive control circuit 34 transmits one more pulse-like driving current to the driving motor 11 for rotation in the normal direction, the protrusion 39a of the lock lever 39 is disengaged from the claw 38b of the engaging portion 38 in the manner similar to that described above and the cam ring 17 is turned further clockwise by the spring 20. Then, the arm 36 becomes engaged with the pin 24 to stop the cam ring 17 at the position to set the movable lens at the second forward-shifted position, thereby bringing the lens barrel 21 to the position for long distance photography. The shutter device sets the photographing lens at the position for medium or long distance photography as described above. When the shutter release button 35 is depressed subsequently, the drive control circuit 34 issues the single pulse-like driving current as described above to rotate the driving motor in the reverse direction and the rotating arm 12 is turned in the direction indicated by the arrow B against the spring 13. Accordingly, the pin 12a is engaged with the inclined step 8b' of the lock lever 8 and turns the lever 8 counterclockwise in FIG. 5. As a result, the engaging portion 8a' of the lock lever 8 is disengaged from the protrusion 5b of the lever 5 to perform the shutter blades opening and closing operation. The operations of the Embodiment 2 to be performed at the subsequent steps are the same as those described with reference to the Embodiment 1 and will be omitted.

Figure 7:
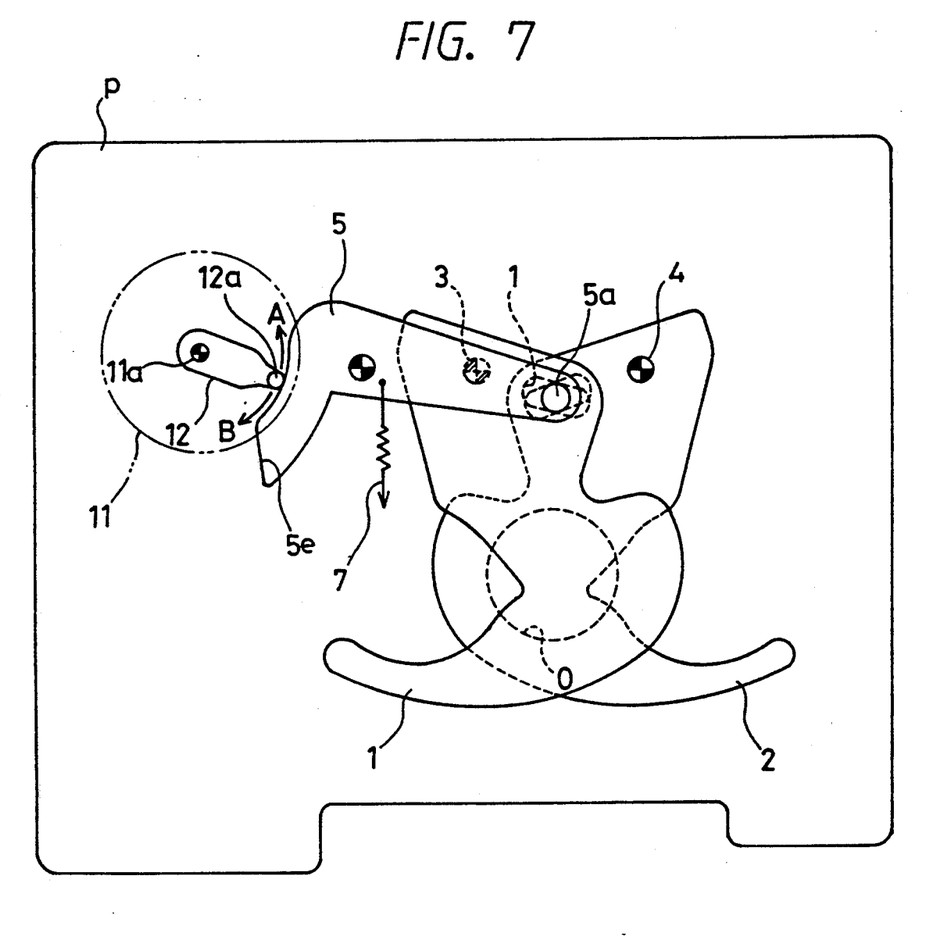
FIG. 7 is a rear view illustrating the main part of an Embodiment 3 of the camera shutter device incorporated with lens shifting mechanism according to the present invention.

FIG. 7 illustrates the Embodiment 3 of the present invention. This embodiment is different from the Embodiments 1 and 2 in the respect that the lock lever 8 does not exist and the shutter blades 1 and 2 are closed by the rotating arm 12 through the shutter blades opening and closing lever 5 in the travel, from a shutter blades opened position at which the rotating arm 12 has been rotated by a predetermined angle in the direction indicated by the arrow B from the neutral position, to the neutral position. However, the Embodiment 3 has a fundamental composition which is substantially the same as that of the Embodiment 1 and will be described briefly, while omitting detailed description on the composition and operations thereof, by using the same reference numerals for the parts which are substantially the same as those of the Embodiment 1. In the Embodiment, the shutter blades opening and closing lever 5 have a first cam surface 5d which acts to hold the lever 5 at the position shown in FIG. 7 (the shutter blades closed position) when the rotating arm 12 is rotated in the direction indicated by the arrow A by a predetermined angle from the neutral position, and a second cam surface 5e for enabling the shutter blades opening and closing lever 5 to rotate clockwise to open the shutter blades 1 and 2 when the rotating arm 12 is rotated in the direction indicated by the arrow B from the neutral position. A single pulse driving current to be supplied to the driving motor 11 to rotate the rotating arm 12 in the direction indicated by the arrow B has a duration time corresponding to a proper exposure time determined by the exposure time control means 33. Accordingly, the shutter blades opening and closing lever 5 is returned to the neutral position shown in FIG. 7 against the force of the spring 7 by the cooperation of the pin 12a and the second cam face 5e when the proper exposure time has passed and the rotating arm 12 is returned to the neutral position. Thus, one opening and closing movement of the shutter blades 1 and 2 carried out. The shutter blades opening and closing lever 5 is held in the shutter blades closed position by the cooperation of the pin 12a and the first cam face 5d and the forward operation of the lens is carried out as described in Embodiment 1 when the rotating arm 12 is rotated in the direction indicated by the arrow A from the neutral position.

Though the set position of the cam ring 17 corresponds to the position for short distance photography in either of the two embodiments described above, it is possible, needless to say, to compose the shutter device according to the present invention in such a manner that the set position of the cam ring 17 corresponds to the position for long distance photography and the lens barrel 21 is moved backward from the set position thereof. Further, the switch means which is composed of the movable contact 28 and the stationary contact 30 may be arranged so that it can be closed by the rotation of the lock lever 8, for example, as indicated by the chain line in FIG. 5. Further, though the Embodiments 1 and 2 are adapted to permit setting the movable lens at two and three photographing positions respectively, it is possible, within the scope of the present invention, to design the camera shutter device so as to permit setting the movable lens at four or more photographing position.

What is claimed is:

1. A camera shutter device incorporated with lens shifting mechanism comprising a driving motor having a rotating arm capable of rotating within an angular range smaller than 90° in normal and reverse directions from a predetermined neutral position by supplying pulse currents different from each other in polarity to the motor, a spring capable of holding said rotating arm at the neutral position when the motor is not energized, a shutter blades opening and closing lever engageable with said rotating arm and biased in a direction in which shutter blades are opened and capable of being brought into a shutter blade closed position by said rotating arm when the motor is energized by the single pulse current to rotate said rotating arm in the normal direction, a first lock lever engageable with said rotating arm and said shutter blades opening and closing lever and locking said shutter blades opening and closing lever at the shutter blades closed position when said rotating arm is in the neutral position and being moved by said rotating arm to unlock said shutter blades opening and closing lever when the motor is energized by the single pulse current to rotate the rotating arm in the reverse direction, a second lock lever engageable with said rotating arm, a lens shifting member biased to move from a standard position to at least out forward-shifted position and being locked at the standard position by said second lock lever when the lens shifting member is brought into the standard position and being unlocked by said second lock lever which is moved by said rotating arm when the motor is energized by the single pulse current to rotate said rotating arm in the normal direction, a driving control circuit connected to said driving motor and capable of supplying the single pulse currents different from each other in polarity to the driving motor to rotate said rotating arm in the normal and reverse directions, a distance measuring circuit means connected to said drive control circuit, and an exposure time control circuit means connected to said drive control circuit, wherein said drive control circuit operates to (a) supply the single pulse current from said drive control circuit to the driving motor to rotate said rotating arm in the normal direction by a predetermined angle from the neutral position and then return said rotating arm to the neutral position when said distance measuring circuit means outputs an output signal to said drive control circuit to cause the rotating arm to engage the second lock lever and release said lens shifting member and cause it to move the lens from the standard position to the forward-shifted position thereof, (b) supply the single pulse current from said drive control circuit to the driving motor to rotate the rotating arm in the reverse direction by a predetermined angle from the neutral position when a shutter release signal is transmitted to said drive control circuit from said exposure time control circuit means, thereby causing the rotating arm to release the shutter blades opening and closing lever from being held by said first lock lever to open the shutter blades, and (c) rotate said driving motor in the normal direction toward the neutral position, thereby causing the rotating arm to engage the opening and closing lever thereby closing the shutter blades when a shutter closing signal is transmitted to said driving control circuit from the exposure time control circuit means.

2. A camera shutter device according to claim 1, wherein said standard position corresponds to a position for short distance photography and said forward-shifted position corresponds to a position for long distance photography.

3. A camera shutter device according to claim 1, wherein said lens shifting member is settable at two positions to set the movable lens at a first and a second forward-shifted positions in conjunction with output signals from said drive control circuit means, said standard position corresponds to a position for short distance photography, said first forward-shifted position corresponds to a position for medium distance photography and said second forward-shifted position corresponds to a position for long distance photography.

4. A camera shutter device incorporated with lens shifting mechanism comprising a driving motor having a rotating arm capable of rotating within an angular range smaller than 90° in normal and reverse directions from a predetermined neutral position by supplying single pulse currents different from each other in polarity to the motor, a spring capable of holding said rotating arm at the predetermined neutral position when the motor is not energized, a shutter blades opening and closing lever engageable with said rotating arm and biasing a direction in which shutter blades are opened and capable of being brought into a shutter blade closed position by said rotating arm when the arm is returned from a reversely rotated position to the neutral position, a lock lever engageable with said rotating arm, a shifting member biased to move from a standard position to at least one forward-shifted position and being locked at the standard position by said lock lever when the lens shifting member is brought into the standard position and being unlocked by said lock lever which is moved by said rotating arm when the motor is energized by the single pulse current to rotate said rotating arm in the normal direction, a driving control circuit connected to said driving motor and capable of supplying the single pulse currents different from each other in polarity to the driving motor to rotate said rotating arm in the normal and reverse directions, a distance measuring circuit means connected to said drive control circuit, and an exposure time control circuit means connected to said drive control means, wherein said drive control circuit operates to (a) supply the single pulse current from said drive control circuit to the driving motor to rotate said rotating arm in the normal direction by a predetermined angle from the neutral position and then return said rotating arm to the neutral position when said distance measuring circuit means outputs an output signal to said drive control circuit, to cause the rotating arm to engage the lock lever and release said lens shifting member and cause it to move the lens from the standard position to the forward-shifted position thereof, (b) supply the single pulse current from said drive control circuit to the driving motor to rotate the rotating arm in the reverse direction by a predetermined angle from neutral position when a shutter release signal is transmitted to said drive control circuit from said exposure time control circuit means, thereby to release the shutter blades opening and closing lever from being held by said rotating arm to open the shutter blades, and (c) rotate said driving motor in normal direction toward the neutral position, thereby causing the rotating arm to engage the opening and closing lever thereby closing the shutter blades when a shutter closing signal is transmitted to said driving control circuit from the exposure time control circuit means.

* * * * *